(12) United States Patent
Harel et al.

(10) Patent No.: US 7,945,222 B2
(45) Date of Patent: May 17, 2011

(54) METHOD, APPARATUS AND SYSTEM FOR PROVIDING TRANSMIT DIVERSITY FEEDBACK

(75) Inventors: Haim Harel, New York, NY (US); Kenneth Kludt, Bedminster, NJ (US)

(73) Assignee: Magnolia Broadband Inc., Warren, NJ (US)

( * ) Notice: Subject to any disclaimer, the term of this patent is extended or adjusted under 35 U.S.C. 154(b) by 669 days.

(21) Appl. No.: 12/048,832

(22) Filed: Mar. 14, 2008

(65) Prior Publication Data

US 2008/0227405 A1 Sep. 18, 2008

Related U.S. Application Data

(60) Provisional application No. 60/906,828, filed on Mar. 14, 2007.

(51) Int. Cl.
*H04B 1/02* (2006.01)
*H04K 3/00* (2006.01)
(52) U.S. Cl. .................. 455/101; 455/69; 455/522
(58) Field of Classification Search .................. 455/69, 455/101, 522; 375/299
See application file for complete search history.

(56) References Cited

U.S. PATENT DOCUMENTS

| | | | |
|---|---|---|---|
| 5,642,353 A | 6/1997 | Roy, III et al. | |
| 5,832,044 A | 11/1998 | Sousa et al. | |
| 5,991,330 A | 11/1999 | Dahlman et al. | |
| 5,999,826 A | 12/1999 | Whinnett | |
| 6,185,440 B1 | 2/2001 | Barratt et al. | |
| 6,226,509 B1 | 5/2001 | Mole et al. | |
| 6,236,363 B1 | 5/2001 | Robbins et al. | |
| 6,330,294 B1 | 12/2001 | Ansbro et al. | |
| 6,343,218 B1 | 1/2002 | Kaneda et al. | |
| 6,392,988 B1 | 5/2002 | Allpress et al. | |
| 6,492,942 B1 | 12/2002 | Kezys | |
| 6,636,495 B1 | 10/2003 | Tangemann | |
| 6,704,370 B1 | 3/2004 | Chheda et al. | |
| 6,745,009 B2 | 6/2004 | Raghothaman | |
| 6,810,264 B1 | 10/2004 | Park et al. | |
| 6,859,643 B1 | 2/2005 | Ma et al. | |
| 6,882,228 B2 | 4/2005 | Rofougaran | |
| 7,321,636 B2 * | 1/2008 | Harel et al. | 375/299 |

(Continued)

FOREIGN PATENT DOCUMENTS

EP 0 986 193 3/2000

(Continued)

OTHER PUBLICATIONS

Derryberry et al., "Transmit Diversity in 3G CDMA Systems", Wideband Wireless Access Technologies to Broadband Internet, IEEE Communications Magazine, Apr. 2002, pp. 68-75.

(Continued)

*Primary Examiner* — Lee Nguyen
(74) *Attorney, Agent, or Firm* — Pearl Cohen Zedek Latzer, LLP

(57) ABSTRACT

A receiver, or base station, may calculate the signal quality improvement based on a change in a diversity control parameter, for example, a phase difference or a power ratio among two or more antennas, by comparing a received signal power level to an expected power level, assuming no change in fading characteristics at the previous timeslot. This method may increase the amount of information communicated between the base station and the mobile unit, and may reduce feedback response time and/or provide for more efficient feedback for transmit diversity systems.

30 Claims, 4 Drawing Sheets

U.S. PATENT DOCUMENTS

| | | | |
|---|---|---|---|
| 7,616,930 B2 * | 11/2009 | Karmi et al. | 455/69 |
| 2002/0098872 A1 | 7/2002 | Judson | |
| 2003/0002594 A1 | 1/2003 | Harel et al. | |
| 2003/0112880 A1 | 6/2003 | Walton et al. | |
| 2004/0048584 A1 | 3/2004 | Vaidyanathan et al. | |
| 2004/0085239 A1 | 5/2004 | Ukena et al. | |
| 2005/0059355 A1 | 3/2005 | Liu | |
| 2005/0143113 A1 | 6/2005 | Lee et al. | |
| 2006/0270359 A1 | 11/2006 | Karmi et al. | |
| 2008/0123775 A1 | 5/2008 | Abreu et al. | |

FOREIGN PATENT DOCUMENTS

| | | |
|---|---|---|
| EP | 1 282 242 | 2/2003 |
| EP | 1 282 244 | 2/2003 |
| EP | 1 284 545 | 2/2003 |
| EP | 1 262 031 | 5/2004 |
| GB | 2 353 437 | 2/2001 |
| JP | 09-238098 | 9/1997 |
| JP | 2000-151484 | 5/2000 |
| WO | WO 97/24818 | 7/1997 |
| WO | WO 00/79701 | 12/2000 |
| WO | WO 01/69814 | 9/2001 |
| WO | WO 03/090386 | 10/2003 |
| WO | WO 2004/045108 | 5/2004 |
| WO | WO 2005/081444 | 9/2005 |

OTHER PUBLICATIONS

Rashid-Farrokhi, et al., "Transmit Beamforming and Power Control for Cellular Wireless Systems", IEEE Journal on Selected Areas in Communications, vol. 16, No. 8, Oct. 1998, pp. 1437-1450.

International Search Report for International Application No. PCT/US2008/057090 mailed Aug. 11, 2008.

* cited by examiner

METHOD, APPARATUS AND SYSTEM FOR PROVIDING TRANSMIT DIVERSITY FEEDBACK

CROSS-REFERENCE TO RELATED APPLICATIONS

This application claims benefit of U.S. Provisional Patent Application Ser. No. 60/906,828, entitled "Method, Apparatus and System for Providing Transmit Diversity Feedback" and filed Mar. 14, 2007, the entirety which is incorporated by reference herein.

FIELD OF THE INVENTION

This invention relates generally to the field of wireless communications and more specifically to providing feedback to a transmitting device so as to modify a signal by controlling a transmit diversity parameter.

BACKGROUND OF THE INVENTION

Wireless transmission systems may use transmit diversity, whereby signals are simultaneously transmitted to a receiver using a plurality of transmit antennas. A transmitting modifying communication device may have multiple antenna elements that transmit signals to communicate information. Multiple antenna elements for transmission may enhance spectral efficiency and capacity, allowing for more users to be simultaneously served over a given frequency band, while reducing signal degradation caused by multi-path and fading. Transmit diversity parameters may be applied to signals transmitted from two or more antennas, and may modify an effective power distribution detected by receivers, such as base stations.

A receiving feedback communication device may receive and extract information from the transmitted signals, and provide a feedback signal to a transmitting device. Accordingly, some transmit diversity systems may use certain feedback signals from the receiver in order to adjust a transmit diversity parameter such as power ratio or phase difference. Knows methods may use, for example, the uplink power control, e.g., power control bits, or reverse power control signal, provided by a base station over the downlink to a mobile terminal as feedback for a transmit diversity parameter.

US Patent Publication No. 2003/0002594, entitled "Communication device with smart antenna using a quality-indication signal," published Jan. 2, 2003 and assigned to the assignee of the present application, the contents of which are hereby incorporated herein by reference, describes using a power control signal, for example, as provided by the power control bit of the CDMA protocol, as a quality indication signal. In some situations, there may be drawbacks in using a power control signal as a signal quality indicator, and adjusting phase thereby.

According to the scheme described, if the power control bit (PCB) indicates "power down", e.g., that the mobile should reduce power, the phase setting algorithm may interpret the phase difference associated with that PCB to be more desirable than if the PCB indicates a "power up", e.g., that the mobile should increase power. The algorithm may assume the change in phase difference to be the dominant statistical reason the power was commanded up or down. As explained below, this may not always be the case, or the statistics may require long time to stabilize degrading transmit diversity performance. Therefore, although the use of the PCB for phase control may be effective, it may have some drawbacks that may be overcome by applying the present invention.

For example, the above and other references discuss using the power control feedback from the base station to the mobile station to determine the effect of the phase shift tests, e.g., perturbations. Some power control schemes typically use a one-bit feedback that causes a fixed, for example, 1 dB power change in the total transmission power of the mobile station. Therefore, for perturbations to be detected by the base station, phase shifts must be introduced that produce a perceived power change at the base station on the order of magnitude of 1 dB. For signals having equal power, this means approximately a phase shift going from perfect phase alignment to an offset of 60 degrees, thereby causing a 1 dB reduction in total power. This amount of phase shift may cause disruptions in the performance of the intended modulations. In addition, it may be desirable to identify the phase-induced power changes with the normal up/down power commands inherent in one-bit power control schemes. What is imbedded in the one-bit is the normal up/down power command, the response of the base station to overcome the effects of fading, the need of the base station to overcome ambient noise variations, and the result of the phase perturbations.

For example, if the base station previously issued a "power up" command (for example, based on signal fading), and the mobile station increases the power by 1 dB and simultaneously adjusts a value of a transmit diversity parameter that degrades reception at the receiver (relative to a previous value of the transmit diversity parameter), the base station may issue a "power down" signal. In such case, the mobile transmitter may mistakenly take this as a sign that the adjustment to the phase difference improved the signal quality.

Similarly, for example, if the base station previously issued a "power down" command (for example, based on signal fading), and the mobile station decreased the power by 1 dB and simultaneously adjusts a value of a transmit diversity parameter that improves reception at the receiver (relative to a previous value of the transmit diversity parameter), the base station may issue a "power up" signal. In such case, the mobile transmitter may mistakenly take this as a sign that the adjustment to the phase difference degraded the signal quality.

In these systems, therefore, the mobile station must perform complicated filtering and selection to deduce the resulting feedback information. There is therefore a need for improved mechanism for providing feedback to a transmit diversity communication device.

SUMMARY OF EMBODIMENTS OF THE INVENTION

In accordance with the present invention, disadvantages and problems associated with previous techniques for transmit diversity power control may be reduced or eliminated. The present invention applies to wireless communication systems that provide transmit diversity control algorithms related to the propagation path conditions, including systems that use uplink power control. In some embodiments of the invention, the method, system and apparatus described in US Patent Publication No. 2003/0002594 may be improved, supplemented or replaced by those describe herein.

Employing the method of the present invention may permit simplification of transmit diversity communication feedback schemes. For example, using a direct feedback scheme of the present invention may eliminate or reduce the need for full rate or fractional rate perturbation. For example, the half-rate perturbation algorithm may typically be used to reduce sensitivity to power control changes and fading-induced power fluctuations and timing differences. However, using embodiments of the present invention, the mobile unit may "hold" the phase for a number time slots, and the difference between the first and the second would be an indication of the rate of fading. This additional information may be useful to make a more intelligent algorithm.

To take another example, a typical full rate perturbation may produce a ±24 degree offset in 12 degree steps using the 1 dB power control bit. Embodiments of the present invention may permit smaller step values and perturbations. For example, using ¼ dB power measurement in the feedback may permit ±12 degree offset in 6 degree steps, thereby providing greater sensitivity and better power conservation of the mobile unit.

According to the embodiments of the present invention, a base station may provide feedback information to a mobile station based on power measurements of the transmissions from the mobile unit. The base station may provide the mobile unit with feedback based on the power measured, taking into consideration the power or power change that it previously commanded from the mobile station using a power control signal, for example, ±1 dB. The base station therefore may measure the differential or residual power from the power commanded, and this may be used by the mobile transmitter as a feedback indicator for the transmit diversity parameter.

Embodiments of the invention may have certain advantages, which may include the elimination of ambient noise from affecting the differential power measurement by the base station, leaving fading and/or phase perturbations as significant causes for the power differences. Accordingly, in some embodiments of the invention, the perturbations of the transmit diversity parameter by the mobile station need not necessarily cause a power change greater than 1 dB in order to be reflected in the feedback signal, as was the case in the prior art methods. Therefore, embodiments of the present invention may enable taking into account finer effects on the signal modulation.

Another advantage of the present invention may be observed during soft hand-off mode of the mobile station. In this case, the primary base station may not be in full control of the mobile transmission power. That is, the primary base station may command the mobile station to increase its transmission power, but a secondary base station within range may request a power reduction. In cases of conflicting commands, the mobile station will typically obey a command for power reduction before considering a power up command. In this case, according to embodiments of the present invention, the mobile station may transmit to the primary base station its true response, i.e., the fact that it decreased power rather than increased power, as commanded by the primary base station. Accordingly, embodiments of the present invention may permit the base station to accurately determine the residual power difference during soft hand-off mode.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
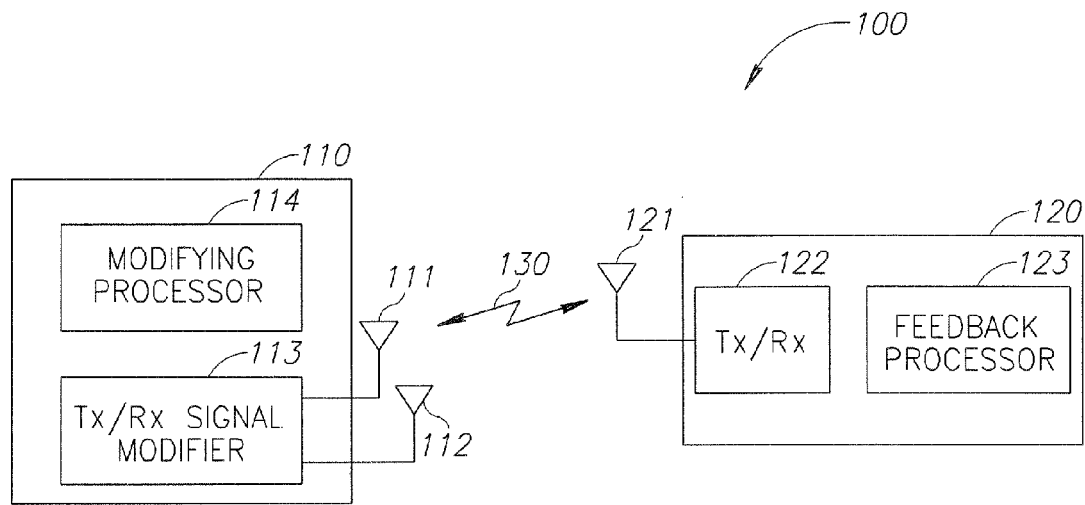
FIG. 1A is a block diagram illustrating one embodiment of a communication system in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The present invention proposes a feedback indication signal for transmit diversity purposes that may be used alternatively or additionally to a PCB feedback signal. Embodiments of the present invention use a dedicated transmit diversity quality indicator from the base station to enhance transmit diversity performance in terms of time response and quality of the diversity parameters, leading to higher diversity gain and network capacity. Diversity gain is the average reduction in total power transmitted by the mobile terminal to maintain the link at the same level of communication, for example, as compared to a single antenna transmitter. Network capacity is the number of links with pre-defined parameters or the throughput, which the network can provide under some given conditions.

According to embodiments of the invention, a dedicated feedback signal from the base station to the mobile station may be used to indicate the absolute or relative quality of a set of transmit diversity parameters used for a previous transmission. The transmit diversity parameters may be one of or a combination of phase difference between signals fed into the antenna ports, power ratio or power difference between these signals, their relative complex weights, etc.

The feedback signal of the present invention may provide an indication of the relative quality of the last transmission received by the base station as related to the transmit diversity parameters. The quality of the signals received by the base station from a mobile terminal transmission may depend on multiple factors: the transmit pilot power, which is controlled by the uplink power control provided by the base stations; the variability in the uplink propagation path between the mobile terminal and the base station; the characteristics of the channels active within this transmission; and the above mentioned parameters controlling transmit diversity.

According to embodiments of the invention, a base station may therefore distinguish whether changes in received signal power or signal quality are based on the effect of the channel activity or changes in a value of the uplink transmit diversity parameter because it knows what uplink power control it transmitted to the mobile station on the downlink, and therefore what changes the mobile station implemented.

After comparing the change in pilot power due to uplink power control, the difference between the reception for which the feedback is provided and previous transmissions may be assumed to be due to changes in transmit diversity parameters and changes in propagation path characteristics. The latter may be divided into two categories: changes due to transmit diversity parameters, which weigh differently the possible propagation paths, and changes over time, which are typically slower and uncorrelated with the effect of transmit diversity, and can thus be ignored in some embodiments of the invention.

Embodiments of the present invention and its advantages are best understood by referring to FIGS. 1 through 5 of the drawings, like numerals being used for like and corresponding parts of the various drawings.

FIG. 1A is a block diagram illustrating one embodiment of a communication system 100 that includes a transmitter 110, also referred to as a modifying communication device, that adjusts at least one nominal value of a transmit diversity parameter, for example, a phase difference between a signal transmitted on a first antenna 111 and a second antenna 112, and/or a power ratio between a signal transmitted on first antenna 111 and second antenna 112. According to the embodiment, transmitter 110 may, for example, perturb a signal at a perturbation rate and transmit the signal to receiving communication device 120, also referred to as a feedback communication device. Feedback communication device 120 may receive the transmit diversity signal at antenna 121 and transmit/receive module 122, process the received signal using processor 123, and transmit feedback information that describes the signal as received by feedback communication device 120. Modifying communication device 110 may receive the feedback information and adjust a nominal value of a transmit diversity parameter at a nominal value adjustment rate based on the feedback information.

According to the illustrated embodiment, communication system 100 operates to provide services such as communication sessions. A communication session may refer to an active communication between endpoints, measured from endpoint to endpoint. Information is communicated during a communication session. Information may refer to voice, data, text, audio, video, multimedia, control, signaling, other information, or any combination of the preceding.

The information may be communicated in packets. A packet may comprise a bundle of data organized in a specific way for transmission, and a frame may comprise the payload of one or more packets organized in a specific way for transmission. A packet-based communication protocol such as Internet Protocol (IP) may be used to communicate the packets.

Communication system 100 may utilize communication protocols and technologies to provide the communication sessions. Examples of communication protocols and technologies include those set by the Institute of Electrical and Electronics Engineers, Inc. (IEEE) 802.xx standards, International Telecommunications Union (ITU-T) standards, European Telecommunications Standards Institute (ETSI) standards, Internet Engineering Task Force (IETF) standards, or other standards.

Devices of communication system 100 may use any suitable multiple access technology, for example, a code division multiple access (CDMA) technology. According to one embodiment, communication system 100 may operate according to a CDMA 2000 telecommunications technology that uses a single CDMA channel. As an example, a CDMA 2000 high rate data packet technology, such as the Evolution Data Optimized (EvDO) technology may be used.

Communication system 100 may comprise any suitable communication network. A communication network may comprise all or a portion of a public switched telephone network (PSTN), a public or private data network, a local area network (LAN), a metropolitan area network (MAN), a wide area network (WAN), a global computer network such as the Internet, a wireless network, a local, regional, or global communication network, an enterprise intranet, other suitable communication link, or any combination of the preceding.

A component of communication system 100 may include logic, an interface, memory, other component, or any suitable combination of the preceding. "Logic" may refer to hardware, software, other logic, or any suitable combination of the preceding. Certain logic may manage the operation of a device, and may comprise, for example, a processor. "Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise a Random Access Memory (RAM), a Read Only Memory (ROM), a magnetic drive, a disk drive, a Compact Disk (CD) drive, a Digital Video Disk (DVD) drive, a removable media storage, any other suitable data storage medium, or a combination of any of the preceding.

Communication system 100 may include one or more modifying communication devices 110 and one or more feedback communication devices 120 that communicate via a wireless link 130. Either or both of communication devices 110 and 120 may be any device operable to communicate information via signals with one or more other communication devices. For example, either of communication devices 110 or 120 may comprise a mobile subscriber unit or a base station. A subscriber unit may comprise any device operable to communicate with a base station, for example, a personal digital assistant, a cellular telephone, a mobile handset, a computer, or any other device suitable for communicating signals to and from a base station. A subscriber unit may support, for example, Session Initiation Protocol (SIP), Internet Protocol (IP), or any other suitable communication protocol.

A base station may provide a subscriber unit access to a communication network that allows the subscriber unit to communicate with other networks or devices. A base station typically includes a base transceiver station and a base station controller. The base transceiver station communicates signals to and from one or more subscriber units. The base station controller manages the operation of the base transceiver station.

In some embodiments of the invention, the feedback communication device 120 may be a base station, and the modifying communication device 110 may be a mobile or other subscriber unit.

Either or both of communication devices 110 or 120 may include one or more antenna elements, where each antenna element is operable to receive, transmit, or both receive and transmit a signal. Multiple antenna elements may provide for a separation process known as spatial filtering, which may enhance spectral efficiency, allowing for more users to be served simultaneously over a given frequency band.

A communication link between communication devices 110 and 120 such as wireless link 130 may be a radio frequency link that is cellular in network organization. Wireless link 130 may be used to communicate a signal between communication devices 120 and 110.

As described more fully below, according to embodiments of the present invention, modifying communication device 110 may include a processor 114 and a transmit/receive module 113 that calculate and produce one or more signals for transmission over at least first and second antennas 111 and 112.

Feedback communication device 120 may include a processor 123 and transmit/receive module 122 that generate and transmit a feedback signal that indicates the quality of the modified signal as received at the feedback communication device 120. Modifying communication device 110 may then modify the transmit signal in accordance with feedback information corresponding to the feedback signal.

According to one embodiment, modifying a signal may refer to modifying a transmission signal feature. A transmission signal feature, or in some embodiments of the invention, a transmit diversity parameter, may refer without limitation to any feature of the transmission, for example, relative phase or phase difference, relative amplitude, relative power or power ratio, absolute power, frequency, timing, other suitable signal feature that may be modulated, or any combination of the preceding. Relative phase may refer to the phase difference between the phase of a first signal of a first transmit antenna element and the phase of a second signal of a second transmit antenna element. Relative power or power ratio may refer to the ratio between the power of a first signal of a first transmit antenna element and the power of a second signal of a second transmit antenna element, which ratio may be defined on a linear or logarithmic scale. Relative amplitude may refer to the ratio between the amplitude of a first signal of a first transmit antenna element and the amplitude of a second signal of a second transmit antenna element. Absolute power may refer to the total power transmitted by all antennas of modifying communication device 110.

According to one embodiment, modifying a signal may be described as adjusting a nominal value of a transmit diversity parameter. As described more fully herein, according to an embodiment of the invention, modulation of a transmit diversity parameter during a perturbation cycle may comprise transmitting using a transmit diversity parameter deviating from the nominal value in a first direction during a first portion of the perturbation cycle and then transmitting using a transmit diversity parameter deviating from the nominal value in a second direction during a second portion of the perturbation cycle.

According to one embodiment of operation of the invention, modifying communication device 110 may modify a signal by perturbing the signal. Perturbing a signal may refer to modulating a signal feature of the signal in relation to a nominal value of the signal, for example, modifying the signal feature in a first direction for a first feedback interval, and in a second direction for another feedback interval. A perturbation cycle may refer to a first modulation in a first direction and a second modulation in a second direction. In some embodiments of the invention, a perturbation cycle may comprise a different, e.g., longer or more complex, sequence of modulations. As an example with respect to phase, a perturbation may include modulating the phase difference in a first direction, and modulating the phase difference in a second direction. If the feedback information provided by the feedback communication device 120 indicates an improvement in the signal received using one perturbation modulation direction compared to the signal received using the other perturbation modulation direction, the next nominal value adjustment may be made in the improved direction in an amount less than or equal to the modulation.

According to embodiments of the invention, the nominal value of a transmit diversity parameter may be perturbed at a first rate, designated the perturbation rate, and the nominal value of the transmit diversity parameter may be adjusted at a second rate, designated the nominal value adjustment rate. The perturbation rate and the nominal value adjustment rates may be the substantially the same or they may be different, and each one may be substantially the same or different than the feedback rate.

According to embodiments of the invention, the nominal value of a transmit diversity parameter may be modified relative to a previous value by adding a positive or negative amount, which may be constant, determined from a predetermined number of amounts, or otherwise calculated based on the feedback information. Typically, phase difference may be changed by an amount in degrees, whereas power ratio may be changed by an amount in decibels. The change in transmit diversity parameter may be relative to a transmit diversity parameter in a previous power control group or slot, or relative to transmit diversity parameter in multiple power control groups or slots as described in US Patent Publication No. 2006/0270359, entitled "Determining a phase adjustment in accordance with power trends" and published Nov. 30, 2006.

In an embodiment of the present invention, feedback communication device 120 may transmit to modifying communication device 110 a power control signal, for example, one or more power control bits, or any type or group of power control signals may be used. A power control signal may indicate to the modifying communication device 110 that it should raise or lower its total power. For example, based on the parameter being modulated, a "quality up" outcome value may instruct modifying communication device 110 to increase the total power of its transmitted signal, and a "quality down" outcome value may instruct modifying communication device 110 to decrease the total power. An outcome value may comprise, for example, a power control bit of a CDMA power control signal, for which "0" represents a command to increase power and a "1" represents a command to decrease power. Thus, for example, a bit value of "1" requesting a decrease in power may indicate "quality up," and a bit value of "0" requesting an increase in power may indicate "quality down." Some CDMA or W-CDMA protocols may allow for additional outcomes, for example, no change in power.

Figure 1B:
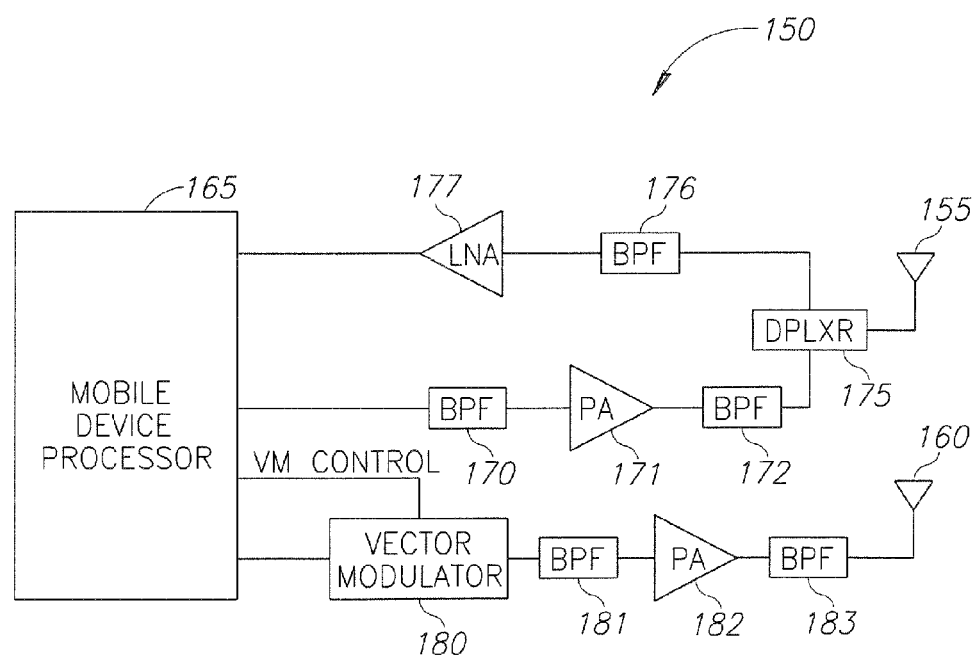
FIG. 1B is a simplified diagram of a transmit diversity communication device in accordance with embodiments of the invention.

FIG. 1B shows a simplified diagram of a two-antenna embodiment of a transmit diversity communication device 150 according to embodiments of the invention, which may be used as modifying device 110 in FIG. 1A. In the device shown, antennas 155 and 160 may transmit simultaneously, with the signal transmitted from one antenna port being a complex weighted version of the signal transmitted from the other antenna port. In operation, the Reverse Link RF signal is applied by mobile device processor 165 to two transmitting chains. In the primary chain, the transmit signal is passed through band pass filter 170, power amplifier 171, and optionally another band pass filter 172, then through duplexer 175 and transmitted on antenna 155. Received signals may be sent on the primary receive chain by duplexer 175 and then to band pass filter 176 and low noise amplifier 177. It will be recognized that primary chain may include additional elements. The secondary chain may be similar to the primary chain, and further include vector modulator 180 to adjust the vector, e.g., phase and/or amplitude, of the secondary transmission with respect to the primary transmission. Secondary transmit chain may further include band pass filter 181, power amplifier 182, and optionally another band pass filter 183, then transmitted on antenna 160. Signal quality feedback from the base station may be used to steer the vector modulator, e.g., phase and/or amplitude, using a vector modulation (VM) control signal to vector modulator 180.

Figure 2:
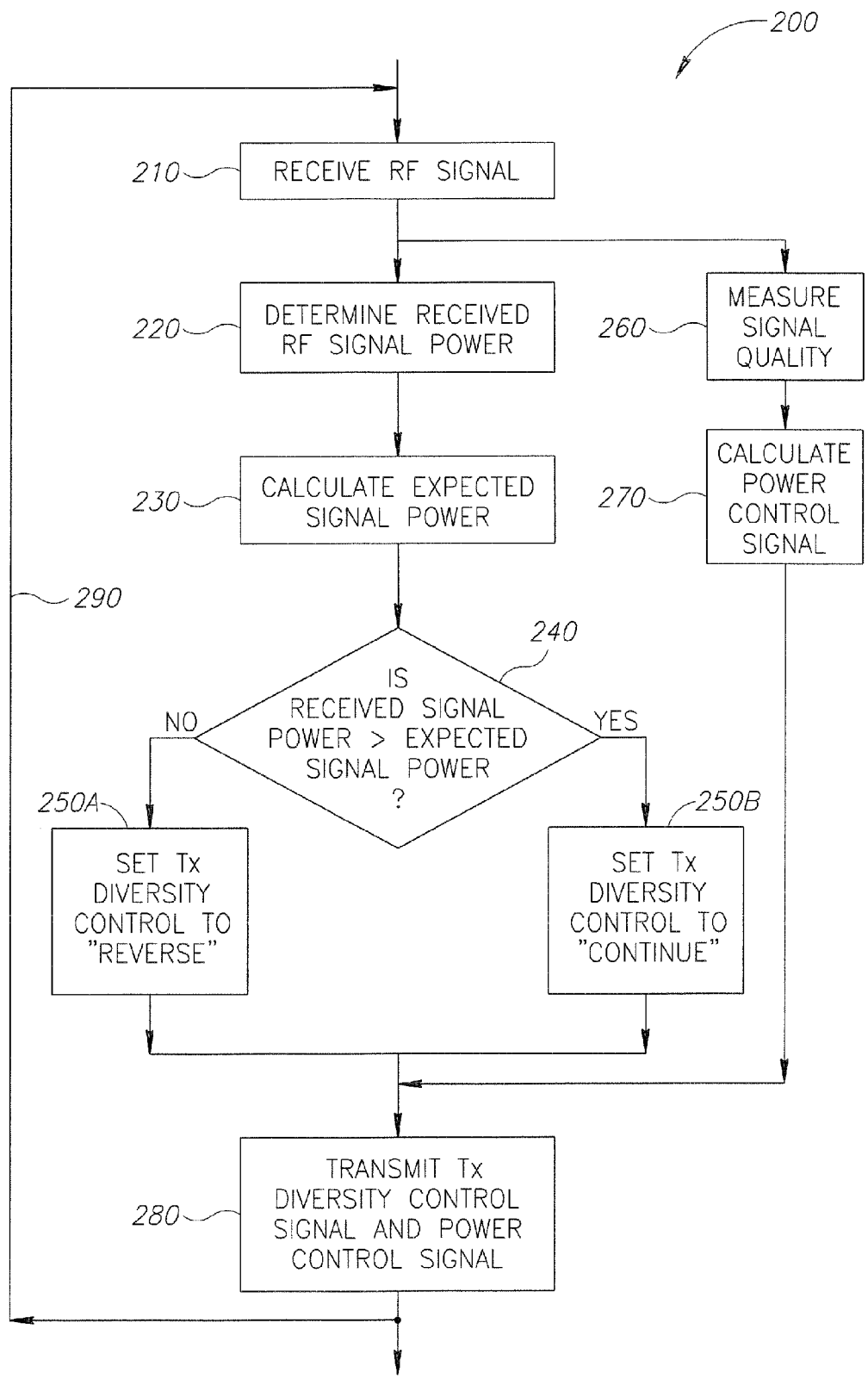
FIG. 2 is a flow diagram of a method that may be performed at a feedback communication device in accordance with some embodiments of the present invention.

FIG. 2 is a flow diagram of a method (200) that may be performed at a feedback communication device or a base station in accordance with the present invention. A radio frequency (RF) signal may be received (210). In some embodiments of the invention, the received RF signal may optionally include a power modification signal other than or in addition to a power control bit as known in the art. As explained below, a power modification signal may expressly indicate whether the power of the RF signal was transmitted based on a power up or power down feedback, e.g., an aggregate power control signal.

A signal quality indicator may be determined. The signal quality indicator may be any of a number of parameters. In the below description, the received RF signal power is used as a parameter for the received signal quality indicator, however, it will be recognized that other received signal quality indicators may be used in some embodiments of the invention. In the embodiment of the invention depicted, the RF signal power may be determined (220). The expected signal power may then be calculated (230). In embodiments of the invention in which the received signal includes a power modification signal, the calculation may involve calculating what would be the expected power assuming the transmitter acted upon the indicated power modification signal. For example, if power modification signal "1" represents power down and power modification signal "0" represents power up, then the expected signal power may be calculated, for example, by incrementing or decrementing the signal power received in a previous RF signal power measurement.

It will be recognized that the diversity control signal providing feedback to the transmit diversity transmitter may be any suitable signal, including a signal having more than one bit. For example, additional bits may carry more detailed feedback information, for example, gradations or ranges or information, or instructions to the mobile transmitter, e.g., regarding adjusting perturbations, step size, and possibly instruction to the transmitter not to change any diversity parameter.

In embodiments of the invention in which the signal received at a base station does not include an express power modification signal, available information may be used to infer what power control signal the transmitter acted upon. Any inference algorithm may be suitable; however, several examples are provided herein. In one algorithm, the feedback unit may assume that the transmitter responded to a recently transmitted power control signal, for example, the most recently transmitted power control signal. In another algorithm, the feedback unit may assume that if the received power signal increased, for example, by more than a threshold amount, then the transmitter acted upon a feedback indication to increase power, and if the received power signal decreased, for example, by more than a threshold amount, then the transmitter acted upon a feedback indication to decrease power. Other algorithms are possible, for example, an algorithm may assume that the transmitter responded to a command to decrease power if the most recent power control signal indicated to decrease power, and the transmitter responded to a command to increase power if the most recent power control signal indicated to increase power and the received power increased since the previously received signal. In some such algorithms according to the present invention, there may be no decisive expected signal power in some instances, for example, when the change in received power is inconsequential.

The following are embodiments of the invention for estimating the expected received power if path loss does not change. In such embodiments, the base station may use the power of previous receptions, for example the received pilot power, as reference and compute new expected receive level changes by estimating increase or decrease of mobile transmit power, which should be the same as on the receive side (in dB).

In one embodiment of the invention, the base station may simply assume that the mobile station is not in a hand-off situation, and therefore, the base station may know that it is the only base station controlling the mobile power.

In another embodiment of the invention, the base station may know how the mobile station responds to power control commands. The base station may have this information, for example, based on the mobile station reporting its power control decision to the base station, as described above. In another embodiment, the base station may receive the estimated power control decision of the mobile from a central controller, to which the various base stations report their power control commands. In yet another embodiment, the base station may determine the power control decision, which the mobile station was supposed to make after receiving all power controls sent to the mobile station from all base stations controlling the mobile station. This information may be received directly from the other base stations through the carrier infrastructure, or from a central controller, e.g. BSC or RNC, to which the base stations report the power control commands they send.

In yet another embodiment of the invention, the base station may consider only responses of the mobile station to power down commands and ignores the actions of a mobile station after the base station transmits power up commands. Since any base station requesting power to be reduced forces the mobile station to reduce power, this embodiment may be certain to avoid considering actions of a mobile station based on a power up command transmitted by another base station, and still allow the base station to process approximately 50% of the signals.

In another embodiment of the invention, the base station may know when it commanded power to go down, and therefore, when it commanded power to go up, it may check reception and determine a most likely response, with a threshold set as a fixed threshold or based on statistics for the network. For example, if the mobile station received transmission power either goes up or down by 1 dB, the threshold may be set at 0 dB (fixed) or, if network statistics are that the mobile will respond to the base station power up control in 70% of the cases, then the threshold may be set below 0, e.g. −0.3 dB.

Thus, the base station may receive and process the pilot channel of the signal transmitted by the mobile station. Within this processing the base station may subtract the uplink power control it sent to the mobile station, which was activated during this transmission, e.g., if the base station sent a power control signal instructing the mobile station to increase transmit power by 1 dB, then the base station may assume that the transmit power was increased by 1 dB, and therefore, the base station may subtract 1 dB from the power measured to bring the analysis to the same level as the previous received power. This process may be extended in a similar manner so that when multiple received slots are analyzed together, they are all brought to a common mobile terminal transmit level.

It will be noted that since there are path loss fluctuations faster than 1 slot, embodiments of the invention may not be completely insensitive to the effect of fading. However, transmit diversity parameters may typically be modified in small relative steps for each slot or power control group. Therefore, the base station may improve performance by processing multiple slots.

The base station may then determine the relative quality of this last reception with respect to the previous ones. The metrics used for this analysis may be the same or similar to those used to determine uplink power control, e.g., ratio of Energy per Bit to the Spectral Noise Density (Eb/No), which may typically be used as a measure of signal to noise ratio for a digital communication system, or any other relevant measure, for example, the pilot power during the slot, the norm of the difference between the received pilot and the reconstructed waveform, etc. The relative quality may be hard-coded, e.g., defined as "better" or "worse" than the previous received signal, or soft-coded, providing it with a multi-level grade compared to the previous received signal or signals.

There may be a number of different techniques of analyzing a received signal to determine the effect of the mobile applied diversity control, all within the scope of the present invention. The nominal expected power on the customary logarithmic scale, not including changes due to power control, may be defined as $$P(\text{nominal,now}) = P(\text{previous}) + \Delta P(\text{change parameters})$$

The base station may measure a receive power level. This may be the level of a constituent of the received signal, e.g. a pilot or reference signal, or the whole signal in which case it has to be brought to a common basis with a previous signal to allow meaningful comparison.

In one embodiment of the invention, the analysis may use a pilot or reference signal, in which case, no additional computation may be required in order to compare the difference between the present and previous received power levels to the threshold defined by the power control.

In another embodiment of the invention, the total power may be used, and both current and past signals may be computed to a common basis.

If there is no change in parameters controlling the structure of the signal, received power need not be compensated but is ready for comparison with the power control dependent threshold.

If there is a change in parameters controlling the structure of the signal, for example, data rate or modulation, then the calculation of the expected power may take into account or compensate for these changes, for example by compensating for each component of the signal structure that may differ for its cumulative impact on the overall power. For example, each component may be computed per its linear power in milliwatts. Compensation in this context may refer to multiplying or dividing one component by the relevant ratio due to the change in parameters, determined by air interface standard or system control, etc.

For example, in a transmission consisting of two channels, where one is a reference and the other is a data-carrying channel 5 dB above it, if the setup parameters of a channel require that for a doubling of its data rate its power must go up by 4 dB, then the expected power of the received signal after doubling the power assuming no change in the reference will be calculated according to the following table:

| Channel | Previous signal | Present signal |
| --- | --- | --- |
| Reference | 1 | 1 |
| Data | $1 \times 10^{4/10} = 2.512$ | $1 \times 10^{9/10} = 7.943$ |
| Total | 3.512 or 5.455 dB | 8.943 or 9.515 dB |

Therefore, 9.515−5.455=4.06 dB should be deducted from the present received power level in order to normalize it. This computation may be extended to any number of channels comprising the signal, as is well known to those versed in the art.

Next, the method may compare the received signal power to the expected signal power (240). Thus, for example, if the received signal power was less than expected, the transmit diversity control parameter may be set to "REVERSE" value (250A), whereas if the received signal power was greater than expected, the transmit diversity control parameter may be set to "CONTINUE" value (250B). Other values may be used for the transmit diversity control signal, for example, "INCREASE" and "DECREASE" and other values as may be evident to those of skill in the art.

It will be recognized that the comparison of an expected received signal power and an actual signal power may be performed in several ways. For example, the expected received signal power may be a normalized parameter, in which the effect of power control is eliminated. Thus, for example, if a power down command is issued by the base station, and keeping constant the transmitter's signal structure, then the expected power may be the same as the previous received signal power, and the actual received signal power, when determined, may be offset by an expected power control increase, and this offset actual received signal strength may be compared to the expected received signal power. In some embodiments, the reverse may be the case. For example, if a power down command is issued by the base station, and keeping constant the transmitter's signal structure, then the expected power may be the preceding received signal power decreased by an expected power control decrease, and this may then be compared against the actual received signal strength. It will be recognized that these and other methods of comparing an expected and an actual signal quality are all within the scope of the present invention.

There may be a variety of techniques for determining how to change a value of a transmit diversity parameter, all of which are within the scope of the present invention.

In one embodiment, as described above, the base station may determine only the direction, for example, "REVERSE" or "CONTINUE". The base station may transmit this command, for example, as a single bit to the mobile station to indicate this decision.

In another embodiment of the invention, the base station may estimate the actual change in diversity control parameter.

Accordingly, in one example, using at least two measurements, or preferably, more than two measurements, the base station may estimate the optimal phase difference relative to a previous phase difference and transmit this information to the mobile station. Since for any initial reference, all changes in phase difference may be known, any previous phase difference may be used as reference, for example, that of the immediately preceding transmission. The number of measurements may correspond to how the mobile changes its phase difference. Thus, if the mobile station perturbs the phase difference, for example, as described in U.S. patent application Ser. No. 11/592,969, two measurements or a multiple thereof, may be used. The number of measurements may be increased for lower perturbation rates. For example, the estimation may use two power control group measurements for full rate perturbation, four power control group measurements for half rate perturbation, and so on. Applying non-perturbation algorithms, such as the one described in U.S. patent application Ser. No. 11/136,020, may requires more measurements.

In another embodiment of the invention, the number of measurements may be at least as large as for the phase difference only; however, it may be larger. For example, the base station may measure receive signal every slot or every two slots if mobile changes its phase difference every two slots.

One algorithm that may be used for the estimation is the selection of the best diversity control parameters among the last N measurements, for example, the best one out of the last four measurements. If the mobile station is applying perturbation, it will typically generate additional values since the selected one measurement will be used as the nominal value, around which perturbation will be applied.

Another algorithm that may be applied to the estimation is mini-max: the various diversity parameters and normalized received power points, normalized to take into account changes due to power control, may be estimated to be points on a characteristic curve of received power plus uncorrelated noise against the diversity parameter, and the diversity parameter value corresponding to the point of maximum received power may be computed.

Thus, a base station may provide the diversity control signal, for example, a phase control bit, in addition to the power control bit. The diversity control signal may have a variety of forms in accordance with the present invention. For example, the diversity control signal may be a one-bit information signal, e.g., up/down or better/worse than the previous slot. In an embodiment of the invention, the information bit can be Code Division Multiplexed (CDM) with the current uplink power control bit in the down link MAC channel and sent to the mobile. In another embodiment of the invention, one bit may be taken from the data channel to carry this information bit. For example, in EVDO network, the diversity control signal may be coded into the data channel by replacing the last bit of the data before the MAC channel with the new information bit. The (bit) error rate may or may not be increased.

As described above, in some embodiments of the invention, the base station may send a single bit "REVERSE" or "CONTINUE". In another embodiment of the invention, the base station may send multiple bits, providing complex control per look-up table. The look-up table may be fixed or may be transmitted to the mobile as presently in use for other parameters. In yet another embodiment of the invention, the base station may send multiple bits over several slots. This embodiment may allow trading bandwidth for time, with a slower multi-valued modification rate of the diversity controls transmitted using a small number, e.g., one, of bits per slot.

The method may also, in accordance with CDMA protocol, measure the signal quality (260) and calculate the power control signal (270) accordingly, for example, by setting a power control bit to "1" for power down and "0" for power up. This calculation may be made before, during or after the diversity control signal calculation.

Finally, the method may transmit the transmit diversity control signal value and the power control signal calculated (280). The transmit diversity control signal may be a single bit, or it may be multiple bits. Thus, for example, the single bit control signal may correspond to the above hard-coded indication, whereas a multiple bit control signal may correspond to the above soft-coded indication. A single bit may be transmitted in each slot, or in one slot every several slots, or spread over multiple slots. Multiple bits may be transmitted within each slot, or in one slot every several slots, or spread over multiple slots.

Transmission of the transmit diversity control signal may be implemented in the downlink channel in a number of ways, all included within the scope of the present invention. For example, a new dedicated channel may be added for this purpose. Alternately, the power control information on the channel may be expanded by increasing its rate, with corresponding increase in its power, which may be achieved by time multiplexing uplink power control and transmit diversity feedback over this modified higher rate channel, or coding them together, or any other combination.

The method may be repeated for signals received that include a power modification signal (290).

In the above embodiment of the invention, the base station may compute the phase control direction required for the mobile unit, and command the mobile unit. Thus, in a one-bit embodiment of this scheme, the base station may command a phase change in the positive or negative direction, or in a forward (i.e., same as previous) or reverse (i.e., opposite of previous) direction. With more than one bit, the feedback communication to the mobile unit may command adjustment of the mobile phase in smaller increments and may also allow for a "no change" feedback option.

It will be recognized that in another embodiment of the invention, the base station may report the residual power measurement in one or more bits to the mobile unit, based upon which the mobile unit may determine the modification on its own. In some instances of such an embodiment of the invention, the increased resolution afforded by more bits may permit elimination of the return link communication from the mobile unit to the base station insofar as the mobile unit could "subtract" the 1 dB power control induced change (it already knows what power change it made) and determine the residual power itself. One advantage of this approach may be that the mobile unit may alter its filtering and algorithm depending on its knowledge of its environment, for example, motion of the mobile unit, which may be known to the mobile but not necessarily to the base station.

In the above discussion, it was assumed that the base station codes its transmit diversity feedback or control signal in a manner similar to the coding of uplink power control, e.g., a "better" feedback may mean that the last transmit diversity parameters were better than the previous ones, and "worse" may mean that the last transmit diversity parameters were worse than the previous ones. However, other implementations of the present invention are possible. The below two embodiments may allow for somewhat different coding, which can then be expanded to many other schemes, all within the scope of the present invention.

One embodiment may provide the definition of the feedback as "up" or "down." The base station does not need to agree with the mobile terminal a priori what is up and what is down, since the reversal of the feedback will be interpreted by the mobile terminal as a reversal in direction. In this embodiment of the invention, when the feedback signal changes direction, e.g., up after down, or down after up, the step in transmit diversity parameters may be small. When the feedback indication is the same, the longer is the sequence of the same feedback, and accordingly, a larger step in the same direction may be implemented. Thus, a second "up" may cause a step in the same direction as the first "up" but larger, and the third consecutive "up" may produce an even larger step, and so on. The same logic may apply to a sequence of "down" steps.

Another embodiment may provide for an accelerated response, using the logic similar to the transition from delta modulation (which corresponds to the simple feedback) to continuously variable slope delta modulation (accelerated response).

It will be recognized that both base station and mobile station transmit continuously in response to each other. Thus, there may be propagation delays of signals from one communication device to the other communication device. The base station may take into consideration any system delays to ensure that the correct prior uplink power control may be associated with the received signals being analyzed. A similar argument may apply to the mobile station to ensure that it also uses the correct information. Also, depending on the signal structure, the mobile station may not be able to adjust its power in the slot immediately following the slot when the base station measures receive signal, i.e. base station sends out power control command next slot. The base station may therefore consider the signal structure when determining which transmission of the mobile station to relate to.

In case the mobile terminal is in communication with multiple base stations (hand-off or hand-over), the proposed scheme may automatically converge to the best transmit diversity parameters. When the transmit diversity parameters are modified to improve reception in the base station receiving the strongest signal, this change may either improve or degrade reception in other base stations. Those receiving improved reception may benefit automatically, whereas those receiving weaker signals may become even weaker relative to the main serving base station. Therefore, the latter need not be taken into consideration for transmit diversity optimization, and eventually may be released from maintaining the communication with the specific mobile terminal.

Figure 3:
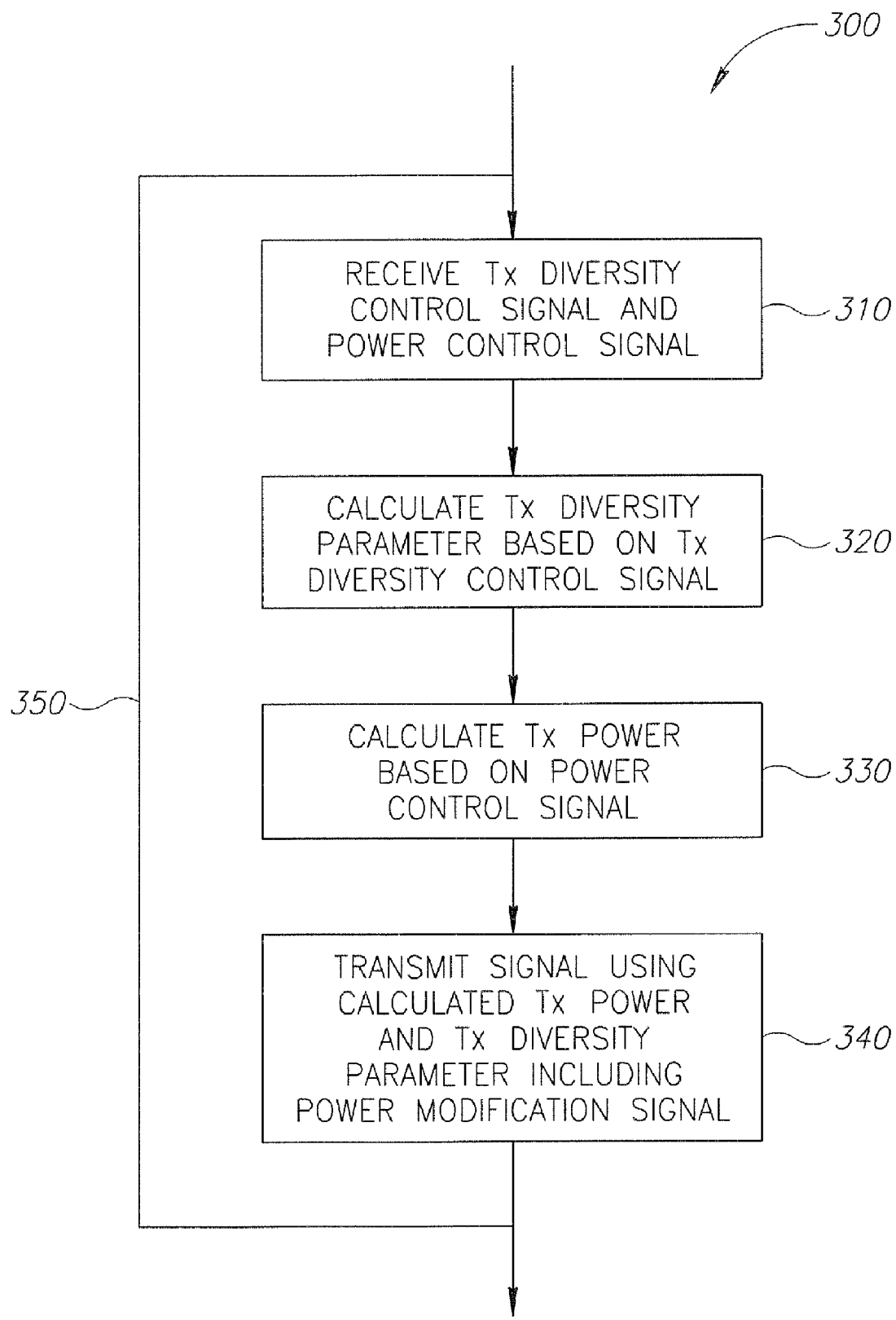
FIG. 3 is a flow diagram of a method that may be performed at a modifying communication device in accordance with some embodiments of the present invention.

FIG. 3 is a flow diagram of a method (300) that may be performed at a modifying communication device or a mobile station in accordance with some embodiments of the present invention. It will be understood that not every embodiment of the present invention may use the uplink from the transmitter to the receiver to send a power modification signal. However, in such embodiments, a signal that includes a transmit diversity control signal and a power control signal may be received (310). It will be recognized that the transmit diversity control signal and the power control signal need not be received in the same communication, but may be received in separate communications.

Next, the transmit diversity parameter, for example, phase difference, may be calculated based on the transmit diversity control signal (320). For example, where the transmit diversity control signal has a "REVERSE" value, the method may calculate the transmit diversity parameter as an increment in the direction opposite to the previous increment, and where the transmit diversity control signal has a "CONTINUE" value, the method may calculate the transmit diversity parameter as an increment in the same direction as the previous increment. Other calculations of transmit diversity parameter may be possible within the scope of the present invention.

There may be a variety of methods for applying the transmit diversity control parameter based on the diversity control signal received from the base station. In one embodiment of the invention, the mobile station may apply the base station diversity control relative to its last used parameters, pipelining the controls. The process may have a delay of n in a cycle including (i) activation of transmit diversity parameters by the mobile station; (ii) receiving of the signal by the base station and analysis; (iii) transmission of base station control to mobile; and (iv) receiving of the control by the mobile, processing and activation on the appropriate timing. The value of n may be 1, 2, etc. According to this embodiment, at time T the mobile station may use the base station control, which may be provided in response to the mobile activation at time equal to T−n, to modify its parameters activated at time T−1.

In another embodiment of the invention, the mobile station may apply the base station diversity control relative to the parameters that the base station used to determine the controls. This means that the modification at time T will be applied to the parameters activated at (T−n), at (T+1) the activated diversity parameters will correspond to a modification of the parameters at (T−n+1), etc.

In yet another embodiment of the invention, the mobile station may apply the base station diversity controls only at certain times. The mobile station may therefore receive multiple controls and may make a single modification after two or more controls from the base station, where the logic and timing of the modification are known to the mobile and base stations.

The transmit power may be calculated based on the power control signal, as is known, for example, based on the CDMA standard or any other standard (330). The power may be incremented or decremented, for example, by predefined steps. It will be recognized that the power control calculation may be made before, during or after the transmit diversity control calculation (320).

Thus, according to embodiments of the present invention, upon receiving the base station feedback, for example, the transmit diversity control signal and the power control signal, the mobile station may take one of a number of actions.

In one embodiment of the invention, the mobile station may determine from the feedback whether the modification of its transmit diversity parameters, as perceived by the base station, was positive or favorable, in which case the mobile station may perform an additional modification of a transmit diversity parameter value in the same direction, or negative or unfavorable, in which case the mobile station may modify the transmit diversity parameter value in the reverse direction. To clarify the concept of direction, the transmit diversity parameter may be regarded as a complex vector, and the direction may be provided by the difference between the transmitted vector and the previously transmitted vector.

In another embodiment of the invention, the mobile station may first determine whether its previously transmitted power, to which the base station is providing transmit diversity feedback, corresponds to the uplink power control provided by this base station, as may typically be the case for the serving base station. However, when one base station requests power up and another base station requests the transmit power to be decreased, the air interface standard may require the mobile terminal to decrease the power. In this case, the mobile terminal may take into account that the base station based its feedback on power that is typically off by twice the uplink power control step. If the feedback still holds under this assumption, then it may be used. Otherwise it may be disregarded.

It will be understood that the actual logic used by the mobile terminal to control its transmit diversity parameters will depend on the specific algorithm in use for this purpose. The algorithm may determine not to modify the transmit diversity parameters even when a single feedback indicates a better or worse reception, based on other feedback indications.

Finally, the signal may be transmitted using the calculated transmit power and the transmit diversity parameter, where the signal includes the power modification signal (340). The power modification signal may provide the result of the transmit power calculation in step 330, for example, may have value "1" for power down and "0" for power down. The method may repeat for transmit diversity control and power control signals received (350).

In some embodiments of the invention, the mobile station may change a transmit diversity parameter, for example, phase difference between antennas, in a predetermined pattern, which may be known to the base station, in which case, the mobile station need not expressly notify the base station of the modification. The base station may analyze reception for each diversity control parameter, taking into account the mobile station change in power according to the power control and transmit parameters, e.g. specific channel activity and data rate. The base station may determine the required diversity control and send it as feedback to the mobile.

Steps of a method in accordance with this embodiment of the present invention, e.g., using the predetermined transmit diversity variation pattern, may include: setting up the diversity control pattern; determining nominal expected receive power per mobile transmit power; analyzing the received signal to determine the effect of the mobile applied diversity control; determining diversity control change; send the transmit diversity control signal to the mobile station; and applying the diversity control signal at the mobile station per base station command.

Described below are embodiments of the present invention based on a transmit diversity control pattern that may be known in form and timing to the base station. The pattern may be pre-determined or set up with other call or session parameters. Synchronization may be achieved by synchronizing the pattern to other known timing, e.g. frame timing, or synchronizing it to the diversity controls provided by the base station.

In one embodiment of the invention, the pattern may be full rate perturbation. The mobile station may offset a phase difference alternately up and down relative to the nominal phase difference controlled by the base station diversity control command.

In a second embodiment of the invention, the pattern may be fractional rate perturbation. The mobile station may offset phase difference, maintaining each offset for one or more slots, so that the average perturbation rate corresponds to the fraction defining the perturbation algorithm. Thus, in a half-rate perturbation, the mobile station will maintain each offset for 2 slots; in two-fifths-rate perturbation, the mobile will maintain half the offsets for 2 slots and half for 3 slots, etc.

In a third embodiment of the invention, the pattern may be fixed pattern perturbation. The mobile station may offset the diversity control parameters, phase or amplitude or both, according to a fixed pattern known to both mobile and base station.

In a fourth embodiment of the invention, the pattern may be pseudo-random perturbation. The mobile station may offset the diversity control parameter according to a pseudo random sequence of values within the required range. The pseudo random sequence may be controlled by some parameter available to both mobile and base stations, such as the frame sequence number in W-CDMA or the start of frame time in CDMA2000.

In an embodiment of the present invention, in order to allow each base station to provide the correct feedback, the mobile terminal may indicate over the air how it actually changed its transmit pilot power. In this case, every base station will know how the power of the last received signal is related to the power of the preceding received signals, thus correctly compensating the power of each received signal being analyzed. The mobile terminal may include the information about the changes to its transmit power over an existing or a new control channel.

It will be recognized that various formats are possible for the power modification signal, for example, the information may be transmitted as the difference between transmitted power in adjacent slots. For a network in which open loop power control is included in the uplink transmission (e.g., CDMA network), this difference between transmit power in adjacent slots may be presented, for example, by transmitting 3 data bits to the base station. One bit may include the sign bit, e.g., up or down. Two other bits may represent four power magnitude ranges, e.g., 0 to 0.5 dB; 0.5 dB to 1.0 dB; 1.0 dB to 1.5 dB; and 1.5 dB to 2.0 dB. For a network in which the open loop power control is not included in the traffic channel, the difference in transmit power may simply be represented by a single bit, e.g., "0" for Power Up and "1" for Power Down. A variety of options are available for transmitting information in accordance with the present invention, for example, the information may be Time Division Multiplexed (TDM) with the uplink pilot.

As described above, the base station may measure the signals arriving at its antenna ports. It may subtract the effect of the difference in mobile transmitted power caused by the PCB that this base station sent. If it is the main serving base station for the mobile station, this correction may be accurate most of the time since this base station is expected to receive the stronger signal, therefore (1) when this base station requests the uplink power to increase, most probably other base stations receiving weaker signals will also be requesting the power to increase, therefore the estimation of change in transmitted mobile terminal power is correct; (2) when this base station requests the uplink power to decrease, the transmit power decreases therefore the estimation of change in transmitted mobile terminal power is correct. Therefore, the base station may be able to associate the different quality of reception with the phase differences (and, in general, the complex weights) used to transmit the signals, and calculate what was the most likely effect of the phase change. This operation is depicted in the following diagrams of FIGS. 4A, 4B and 4C, which shows a time sequence of power control and phase changes.

Figure 4A:
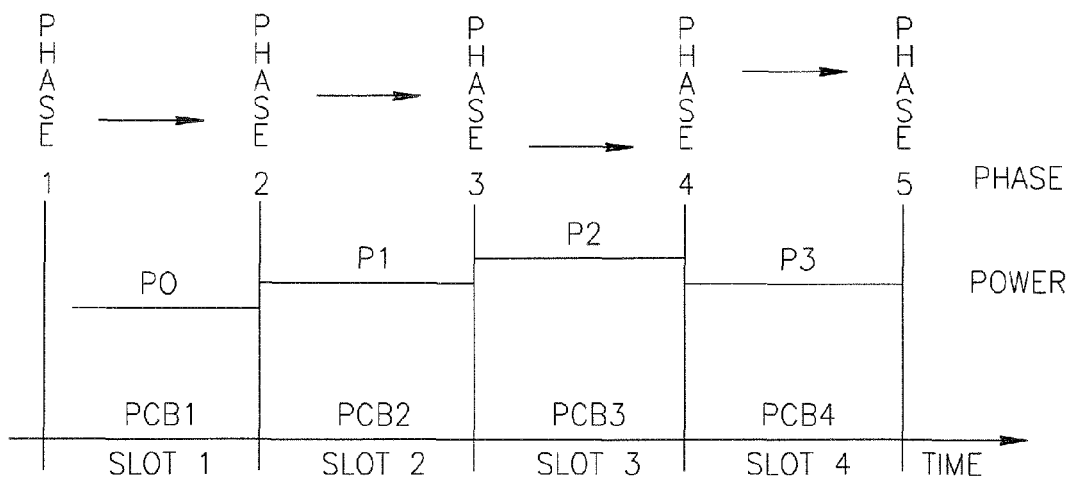
FIGS. 4A, 4B and 4C show a time sequence diagram of power control and phase changes.

FIG. 4A shows a time sequence of power control and phase changes. Transmitted power by the mobile changes with the commands (PCBs) received. The power changes are determined by the value of the PCB received in the previous slot. For example, the change from P1 to P2 in Slot 3 is determined by the PCB2 value sent in Slot 2. For this figure, the phases appear to be random because their values are based on history of PCBs prior to Slot 1.

Figure 4B:
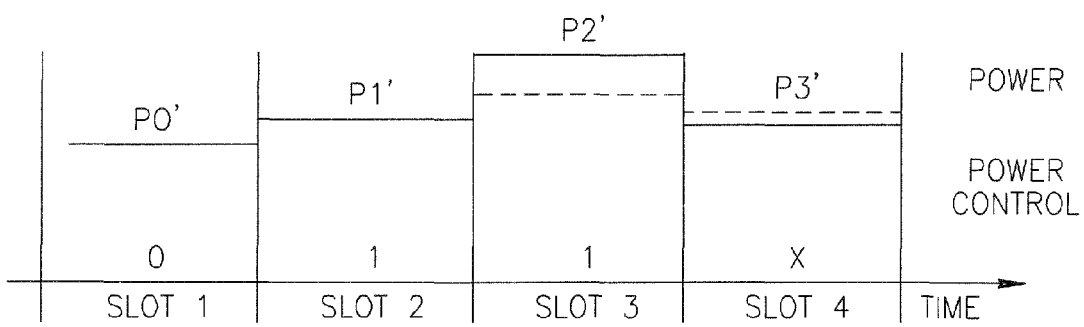
Figure 4C:
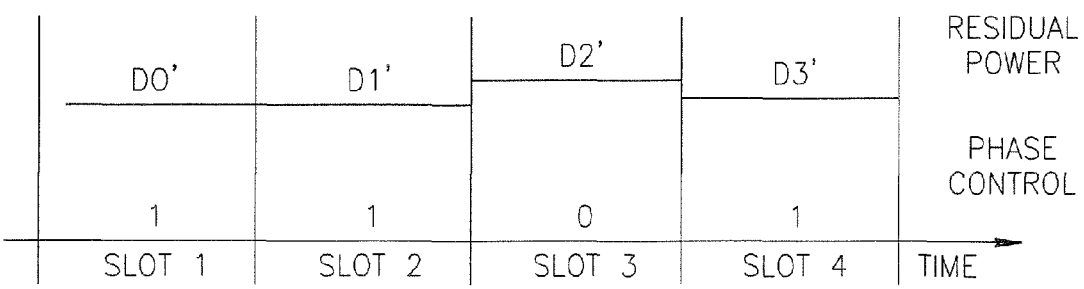

FIG. 4B shows the situation of FIG. 4A with the relative transmitted power shown as a dashed line and the signal level received at the base station shown as a solid line. Although the transmitted level changed 1 dB at the mobile, transmission path effects (fading and phase changes) made the signal level at the base station change by different amounts. Since the base station is generally aware of the direction of the PCB, it can "subtract" out this part of the received signal change and report the direction the signal took because of fading and phase only. This is shown in FIG. 4C. The Phase Control Bit identifies the direction of the change of the residual power (measured power minus the 1 dB from the PCB), and its value is never "no difference." It may be assumed that the measured power may always be slightly different from slot to slot so a "no change" value is not necessary. However, it may be more useful if more than one bit were assigned to the Phase Control signal to quantify amplitude and direction of the measured power.

An implementation of embodiments of the present invention may include measurement and computation in the base station to measure, calculate, and report on a slot-by-slot basis the power received at its antenna. Further, means to report the results in the downlink in the form of quality indicator bit(s) may be included. In one embodiment of the invention, this may be performed soon enough that the results may be sent in the same timeslot with no latency. Embodiments of the invention may decode the quality indicator signal by the baseband in the mobile and reporting to the phase control algorithm.

It will be recognized that although the above description refers to embodiments of the invention applied for uplink transmit diversity control, the principles of the invention may apply to the downlink, for example, by reversing the roles of the mobile terminal and the base station.

It will be recognized that a base station in accordance with the present invention may distinguish between mobile transmitters utilizing an embodiment of the present invention from those that are not. For example, a base station may then create and respond to the feedback information from the transmitter if the connected mobile is a MTD mobile. In contrast, a conventional mobile transmitter may not receive the feedback information from the base station, nor create the feedback information on the uplink to the base station.

It will be understood that while embodiments of the present invention have been described as mobile and base stations, and uplink and downlink, the present invention may also be applied by reversing the roles of the mobile terminal and the base station, with necessary changes.

Certain embodiments of the invention may include none, some, or all of the above technical advantages. One or more other technical advantages may be readily apparent to one skilled in the art from the figures, descriptions, and claims included herein.

The previous description of the embodiments is provided to enable any person skilled in the art to make or use the invention. While the invention has been particularly shown and described with reference to embodiments thereof, it will be understood by those skilled in the art that various changes in form and details may be made therein without departing from the spirit and scope of the invention. For example, any mobile communication protocol may be used, for example, CDMA or other types of protocols. For example, the communication devices similar to those described above can be used with time-division multiple access (TDMA) or frequency-division multiple access (FDMA) protocols. Such a TDMA protocol can include, for example, the Global Systems for Mobile Communications (GSM) protocol.

Note that although the tuning of a communication device is described through the use of complex weighting, in other embodiments other types of control signals can tune the communication device. In other words, the tuning of a communication device through the use of such control signals need not be limited to information about varying the magnitude and phase of the signal. For example, the control signals can carry information to vary the magnitude, phase, frequency and/or timing of the signal associated with each antenna element.

While various embodiments of the invention have been described above, it should be understood that they have been presented by way of example only, and not limitation. Thus, the breadth and scope of the invention should not be limited by any of the above-described embodiments, but should be defined only in accordance with the following claims and their equivalents.

What is claimed is:

1. A method comprising:
   receiving a first transmission signal from a mobile communication device, said first transmission signal transmitted simultaneously using at least two antennas, wherein signals transmitted on first and second antennas differ by a first value of a transmit diversity parameter;
   transmitting to said mobile communication device a first feedback indicator based on a signal quality indicator of the received first transmission signal;
   calculating an expected signal quality indicator based at least on said signal quality indicator of the received first transmission signal and on said first feedback indicator transmitted to the mobile communication device;
   receiving a second transmission signal from the mobile communication device, said second transmission signal transmitted simultaneously using at least two antennas, wherein signals transmitted on first and second antennas differ by a second value of a transmit diversity parameter;
   transmitting to said mobile communication device a second feedback indicator based on a comparison of said expected signal quality indicator and a signal quality indicator of the received second transmission signal.

2. The method of claim 1, wherein the transmit diversity parameter is a phase difference between signals transmitted on said first and second antennas.

3. The method of claim 1, wherein the transmit diversity parameter is a power ratio between signals transmitted on said first and second antennas.

4. The method of claim 1, further comprising at the mobile communication device:
   receiving said second feedback indicator; and
   transmitting a third transmission signal, said third transmission signal transmitted simultaneously using at least two antennas of the mobile communication device, wherein signals transmitted on first and second antennas differ by a third value of a transmit diversity parameter, said third value based at least on the second feedback indicator.

5. The method of claim 1, wherein calculating said expected signal quality indicator comprises:
   modifying said signal quality indicator of the received second transmission signal by an expected signal quality difference corresponding to said transmitted first feedback indicator.

6. The method of claim 5, wherein said first feedback indicator is a power control signal, and wherein modifying said signal quality indicator of the received second transmission signal by an expected signal quality difference corresponding to said transmitted first feedback indicator comprises:
   if the first feedback indicator is a power down power control signal, then incrementing said signal quality indicator by an expected power decrease.

7. The method of claim 6, wherein modifying said signal quality indicator of the received second transmission signal by an expected signal quality difference corresponding to said transmitted first feedback indicator further comprises:
   if the first feedback indicator is a power up power control signal, then decrementing said signal quality indicator by an expected power increase.

8. The method of claim 1, wherein calculating said expected signal quality indicator comprises:

modifying said signal quality indicator of the received first transmission signal by an expected signal quality difference corresponding to said transmitted first feedback indicator.

9. The method of claim 8, wherein said first feedback indicator is a power control signal, and wherein modifying said signal quality indicator of the received first transmission signal by an expected signal quality difference corresponding to said transmitted first feedback indicator comprises:
if the first feedback indicator is a power down power control signal, then incrementing said signal quality indicator by an expected power decrease.

10. The method of claim 9, wherein modifying said signal quality indicator of the received first transmission signal by an expected signal quality difference corresponding to said transmitted first feedback indicator further comprises:
if the first feedback indicator is a power up power control signal, then decrementing said signal quality indicator by an expected power increase.

11. The method of claim 1, wherein the said second feedback indicator comprises at least a transmit diversity control signal.

12. The method of claim 11, wherein said transmit diversity control signal has a value selected from the set consisting of: a reverse value and a continue value.

13. The method of claim 11, wherein transmitting to said mobile communication device the second feedback indicator comprises:
if said signal quality indicator of the received second transmission is greater than the expected signal quality indicator, then transmitting the second feedback indicator so as to indicate to the mobile communication device to modify a transmit diversity parameter in a same direction as a preceding transmit diversity parameter modification.

14. The method of claim 11, wherein transmitting to said mobile communication device the second feedback indicator comprises:
if said signal quality indicator of the received second transmission is less than the expected signal quality indicator, then transmitting the second feedback indicator so as to indicate to the mobile communication device to modify a transmit diversity parameter in an opposite direction as a preceding transmit diversity parameter modification.

15. The method of claim 1, wherein calculating said expected signal quality indicator comprises calculating said expected signal quality indicator based at least on a change in signal structure of the second transmission signal relative to the first transmission signal.

16. A communication apparatus comprising:
a receiver to receive a first transmission signal from a mobile communication device, said first transmission signal transmitted simultaneously using at least two antennas, wherein signals transmitted on first and second antennas differ by a first value of a transmit diversity parameter;
a processor to calculate a first feedback indicator based on a signal quality indicator of the received first transmission signal;
a transmitter to transmit said signal quality indicator to the mobile communication device, and
wherein said processor is further to calculate an expected signal quality indicator based at least on said signal quality indicator of the received first transmission signal and on said first feedback indicator transmitted to the mobile communication device,
wherein said receiver is further to receive a second transmission signal from the mobile communication device, said second transmission signal transmitted simultaneously using at least two antennas, wherein signals transmitted on first and second antennas differ by a second value of a transmit diversity parameter,
wherein said processor is further to calculate a second feedback indicator based on a comparison of said expected signal quality indicator and a signal quality indicator of the received second transmission signal, and
wherein said transmitter is to transmit to said mobile communication device said second feedback indicator.

17. The apparatus of claim 16, wherein the transmit diversity parameter is a phase difference between signals transmitted on said first and second antennas.

18. The apparatus of claim 16, wherein the transmit diversity parameter is a power ratio between signals transmitted on said first and second antennas.

19. The apparatus of claim 16, wherein said processor is to calculate said expected signal quality indicator by modifying said signal quality indicator of the received second transmission signal by an expected signal quality difference corresponding to said transmitted first feedback indicator.

20. The apparatus of claim 19, wherein said first feedback indicator is a power control signal, and wherein said processor is to modify said signal quality indicator of the received second transmission signal by an expected signal quality difference corresponding to said transmitted first feedback indicator by incrementing said signal quality indicator of the received second transmission signal by an expected power decrease if the first feedback indicator is a power down power control signal.

21. The apparatus of claim 20, wherein said processor is further to modify said signal quality indicator of the received second transmission signal by an expected signal quality difference corresponding to said transmitted first feedback indicator by decrementing said signal quality indicator by an expected power increase if the first feedback indicator is a power up power control signal.

22. The apparatus of claim 19, wherein said processor is to calculate said expected signal quality indicator by calculating said expected signal quality indicator based at least on a change in signal structure of the second transmission signal relative to the first transmission signal.

23. The apparatus of claim 16, wherein said processor is to calculate said expected signal quality indicator by modifying said signal quality indicator by an expected signal quality difference corresponding to said transmitted first feedback indicator.

24. The apparatus of claim 23, wherein said first feedback indicator is a power control signal, and wherein said processor is to modify said signal quality indicator by an expected signal quality difference corresponding to said transmitted first feedback indicator by incrementing said signal quality indicator by an expected power decrease if the first feedback indicator is a power down power control signal.

25. The apparatus of claim 24, wherein said processor is further to modify said signal quality indicator by an expected signal quality difference corresponding to said transmitted first feedback indicator by decrementing said signal quality indicator by an expected power increase if the first feedback indicator is a power up power control signal.

26. The apparatus of claim 16, wherein the said second feedback indicator comprises at least a transmit diversity control signal.

27. The apparatus of claim 26, wherein said transmit diversity control signal has a value selected from the set consisting of: a reverse value and a continue value.

28. The apparatus of claim 26, wherein said processor is to transmit to said mobile communication device the second feedback indicator by:
   transmitting the second feedback indicator so as to indicate to the mobile communication device to modify a transmit diversity parameter in a same direction as a preceding transmit diversity parameter modification if said signal quality indicator of the received second transmission is greater than the expected signal quality indicator.

29. The apparatus of claim 26, wherein said processor is to transmit to said mobile communication device the second feedback indicator by:
   transmitting the second feedback indicator so as to indicate to the mobile communication device to modify a transmit diversity parameter in an opposite direction as a preceding transmit diversity parameter modification if said signal quality indicator of the received second transmission is less than the expected signal quality indicator.

30. A system comprising:
   a base station comprising the apparatus of claim 16; and
   a mobile communication device having at least two antennas comprising:
      a receiver to receive said second feedback indicator,
      a processor to determine a third value of a transmit diversity parameter, said third value based at least on the second feedback indicator, and
      a transmitter to transmit on said first and second antennas a third transmission signal, said third transmission signal transmitted simultaneously using the two antennas, wherein signals transmitted on first and second antennas differ by the third value of the transmit diversity parameter.

\* \* \* \* \*